United States Patent
Röhm

[11] Patent Number: 5,499,829
[45] Date of Patent: Mar. 19, 1996

[54] LOCKABLE DRILL CHUCK

[76] Inventor: Günter H. Röhm, Heinrich-Röhm-Strasse 50, D-89567 Sontheim, Germany

[21] Appl. No.: 399,895

[22] Filed: Mar. 7, 1995

[30] Foreign Application Priority Data

Mar. 9, 1994 [DE] Germany .................. 44 07 854.4

[51] Int. Cl.⁶ ................................................ B23B 31/12
[52] U.S. Cl. .................. 279/62; 74/577 SF; 279/140; 279/902
[58] Field of Search ............... 279/60–65, 140, 279/902; 74/577 SF

[56] References Cited

U.S. PATENT DOCUMENTS

| | | | |
|---|---|---|---|
| 573,189 | 12/1896 | Vogel | 279/62 |
| 5,431,419 | 7/1995 | Mack | 279/902 |
| 5,435,578 | 7/1995 | Rohm | 279/140 |

*Primary Examiner*—Steven C. Bishop
*Attorney, Agent, or Firm*—Herbert Dubno; Andrew Wilford

[57] ABSTRACT

A lockable drill chuck has a chuck body and an adjustment body rotatable on the chuck body relative to an axis and fixed axially thereon. Respective jaws in guides of one of the bodies have toothed edges meshing with a screwthread of the other body so that rotation of the adjustment body on the chuck body in a forward closing direction about the axis moves the jaws radially toward one another and opposite rotation in an opening direction moves the jaws radially apart. Radially inwardly directed sawteeth is provided on the adjustment body. An elastically deformable locking arm fixed on the chuck body has a free outer end and sawteeth offset from the free end and engageable with the adjustment-body teeth. The arm is radially deflectable between an outer meshed position with the locking-arm sawteeth meshing with the adjustment-body sawteeth and an inner out-of-mesh position. A positioning ring is rotatable on the chuck body between angularly offset locked and unlocked positions and has an actuation part engageable in the locked position with the free end of the locking arm to urge same radially outward into its outer position. The sawteeth are angled such that in the meshed position they positively inhibit rotation of the positioning ring relative to the locking ring in the opening direction while rotation of the positioning ring relative to the locking ring in the closing direction cams the sawteeth radially apart.

12 Claims, 6 Drawing Sheets

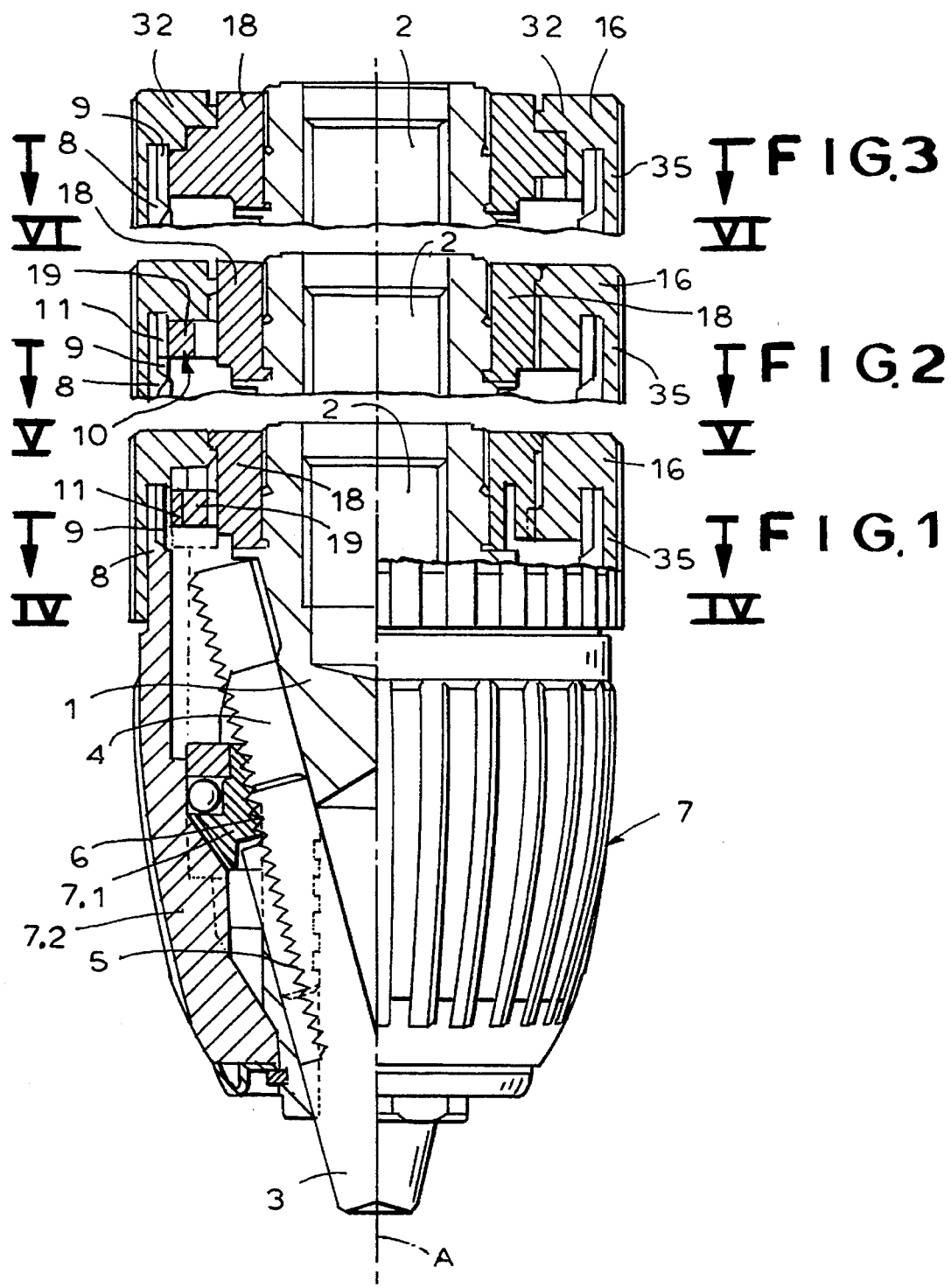

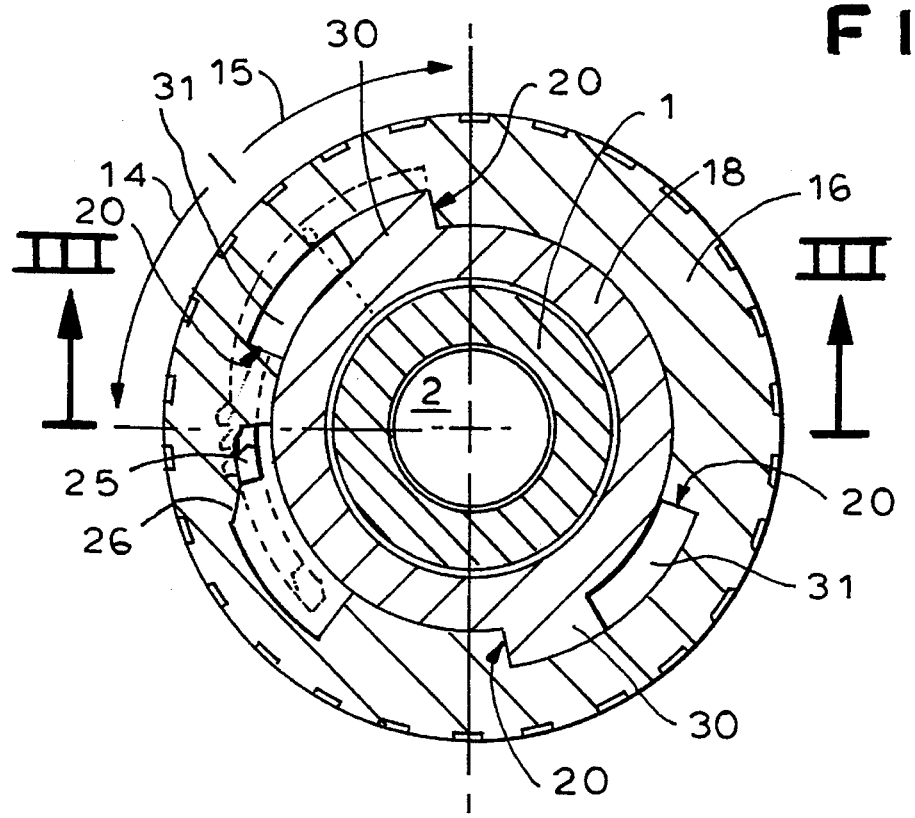
F I G. 6
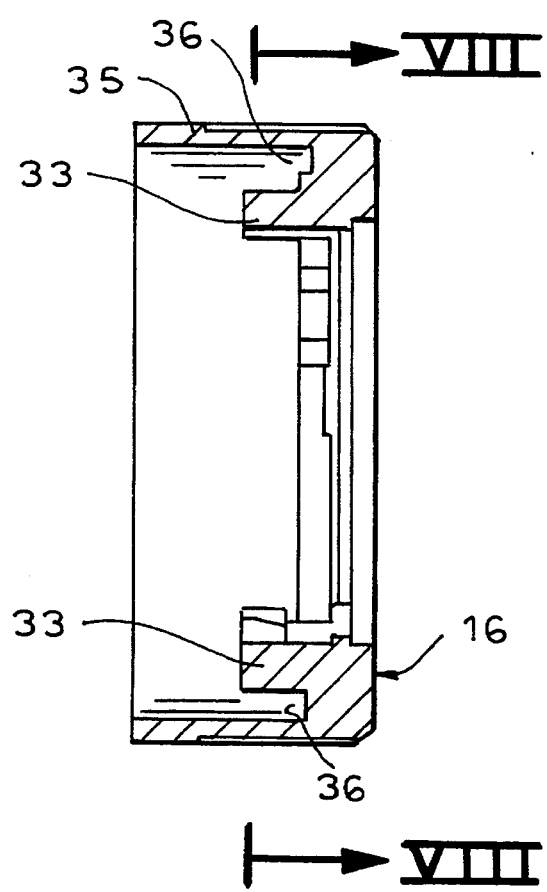
F I G. 7

LOCKABLE DRILL CHUCK

FIELD OF THE INVENTION

The present invention relates to a drill chuck. More particularly this invention concerns a lockable chuck such as is used on a hammer drill.

BACKGROUND OF THE INVENTION

A self-tightening chuck has, according my earlier patent application Ser. No. 08/225,525 filed 11, Apr. 1994, now U.S. Pat. No. 5,435,578, a chuck body centered on an axis and adapted to be rotated thereabout, a plurality of jaws radially displaceable on the body, and an adjustment sleeve rotatable on the body, formed with radially inwardly directed teeth, and engaged with the jaws such that rotation of the adjustment sleeve on the body in a forward direction displaces the jaws radially inward on the body and opposite rotation in a reverse direction displaces the jaws radially outward. A tightening ring rotatable on the body has stop formations for limiting its rotation on the body to a predetermined angular travel and a tightening spring braced angularly between the tightening ring and the body urges the tightening ring angularly in the forward direction. A locking body radially displaceable on the tightening ring is formed with teeth meshable with teeth of the tightening ring. A locking spring braced radially against the locking body urges the locking-body teeth into mesh with the adjustment-sleeve teeth. The locking-body and adjustment-sleeve teeth are angled such that they lock together and rotationally couple the locking body and tightening ring to the adjustment sleeve on forward rotation of the tightening ring relative to the adjustment sleeve but slide past each other on forward rotation of the adjustment sleeve relative to the tightening ring. A locking ring angularly displaceable on the chuck body has a formation engageable with the body and displaceable between an unlocked position displacing the locking body radially inward out of engagement with the adjustment sleeve and a locked position leaving the locking body pressed radially by its locking spring against the adjustment sleeve. Stop formations engageable with the locking ring limit angular travel of the locking ring on the chuck body to an angular travel that is greater than the angular travel of the tightening ring on the chuck body.

The chuck according to this earlier invention is operated by gripping the locking ring in one hand and the adjustment sleeve in the other and relatively twisting them in the forward closing or backward opening direction, depending on what is wanted. As the adjustment ring is turned backward to open the chuck it first entrains the tightening ring backward against the force of the locking spring to pivot it relative to the locking ring, effectively moving the locking ring into the unlocked position so that further backward rotation retracts the jaws. Forward rotation similarly first moves the locking ring into the locked position and thereafter advances the jaws, with ratcheting of the adjustment-body teeth on the locking-body teeth. Such operation is intuitive and involves no careful gripping and/or manipulation of, for instance, the tightening ring. On tightening the forward torque is applied directly to the adjustment sleeve so that the chuck can be made very tight. Once tightened, the tightening spring will be loaded to rotate the adjustment sleeve forward if the chuck loosens.

A problem with this known chuck is that during drilling, in particular hammer drilling which subjects the chuck to considerable dynamic forces in every direction, the locking- and tightening-body teeth can be knocked out of engagement with each other. This allows the chuck to loosen, releasing the bit engaged in its jaws. Such disengagement is possible when teeth formed at the free end of an arm on the locking body vibrate out of engagement with the teeth of the tightening body, even though this arm is being biased outward by engagement near its base.

OBJECTS OF THE INVENTION

It is therefore an object of the present invention to provide an improved lockable drill chuck.

Another object is the provision of such an improved lockable drill chuck which overcomes the above-given disadvantages, that is which stays locked even when subjected to substantial multidirectional dynamic forces.

SUMMARY OF THE INVENTION

A lockable drill chuck has according to the invention a chuck body rotatable about an axis and an adjustment body rotatable on the chuck body relative to the axis and fixed axially thereon. One of the bodies is formed with a plurality of angled guides spaced about the axis and the other body is formed with a screwthread. Respective jaws in the guides have toothed edges meshing with the screwthread so that rotation of the adjustment body on the chuck body in a forward closing direction about the axis moves the jaws radially toward one another and opposite rotation in a reverse opening direction moves the jaws radially apart. An array of radially inwardly directed sawteeth is provided on the adjustment body. A locking ring on the chuck body has an elastically deformable locking arm having a free outer end and sawteeth offset from the free end and engageable with the adjustment-body teeth. The arm is radially deflectable between an outer meshed position with the locking-arm sawteeth meshing with the adjustment-body sawteeth and an inner out-of-mesh position. A positioning ring is rotatable on the chuck body about the axis between angularly offset locked and unlocked positions and has an actuation part engageable in the locked position with the free end of the locking arm to urge same radially outward into its outer position. The sawteeth are angled such that in the meshed position they positively inhibit rotation of the positioning ring relative to the locking ring in the opening direction while rotation of the positioning ring relative to the locking ring in the closing direction cams the sawteeth radially apart. The arm is sufficiently elastically deformable that, in the locked and meshed positions, rotation of the locking ring in the closing direction relative to the locking ring cams the teeth apart enough to slip angularly relative to one another. Abutments on the chuck body are engageable with the positioning ring and limit rotation of the positioning ring to movement between its positions.

Thus with this arrangement the arm is biased elastically into the meshed position in such a manner that the teeth will not be likely to jump out of mesh with each other if the chuck is subjected to radial shocks. On the other hand it is still possible to tighten the chuck when it is closed by ratcheting of the sawteeth on each other.

According to the invention the locking ring is fixed on the chuck body. The arm defines an angularly open slot having a mouth and in the locked position the actuation part engages through the mouth into the slot and is braced radially outward against the arm. The free end of the arm and the actuation part have complementary and angularly engageable bevels. Furthermore in the locked position the actuation part directly contacts and bears radially inward on the chuck body and directly contacts and bears radially outward on the free end of the arm. The slot has at its free end in the inner position a radial width smaller than a radial thickness of the actuation part. This is an extremely stable structure where the actuation part is braced radially between the free end of the arm and the outer surface of the locking ring to hold the arm very solidly.

The arm in accordance with this invention is formed offset from its free end at its sawteeth with an axially projecting pin. The positioning ring has an angled cam that engages and radially inwardly presses the projecting pin in the unlocked position of the positioning ring. Thus in the unlocked or open position the teeth are positively held out of contact with one another.

One of the rings according to the invention has a radially deflectable and axially extending projection and the other ring has a radially projecting bump angularly engageable with the projection. The projection lies to one angular side of the bump in the locked position and to the other angular side of the bump in the unlocked position and is elastically deflected inward as the positioning ring moves between the locked and unlocked positions. This projection is an axially extending pin formed on the locking ring and the projection and bump have complementary and angularly engageable bevels.

The positioning ring is formed with at least one radially inwardly open pocket having flanks and the locking ring has a radially outwardly projecting tab extending into the pocket and having flanks engageable with the pocket flanks and forming therewith the abutments. In addition the teeth of the adjustment body have steep and shallow flanks and the steep flank of each tooth is axially ahead of the respective shallow flank in the opening direction.

BRIEF DESCRIPTION OF THE DRAWING

The above and other objects, features, and advantages will become more readily apparent from the following description, reference being made to the accompanying drawing in which:

FIG. 1 is an axial section through a chuck according to the invention in the open position taken along line I—I of FIG. 4;

FIGS. 2 and 3 are axial sections through the rear end of the chuck in the closed and open positions, respectively taken along lines II—II and III—III of FIGS. 5 and 6;

FIGS. 4, 5, and 6 are sections taken respectively along lines IV—IV, V—V, and VI—VI of FIGS. 1, 2, and 3, respectively;

FIG. 7 is an axial section through the positioning ring of the chuck;

SPECIFIC DESCRIPTION

Figure 5:
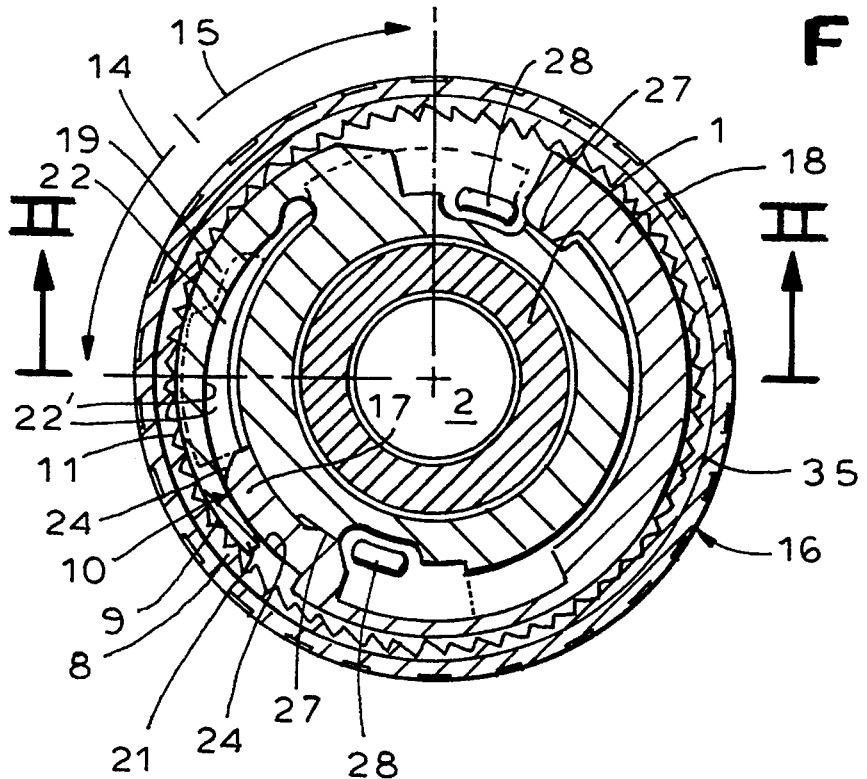

As seen in FIG. 1 a chuck according to this invention has a body 1 centered on an axis A and formed on the axis A with a rearwardly open threaded bore 2 that is normally fitted to the spindle of a drill drive unit. Three angularly equispaced jaws 3 are axially and radially displaceable in respective angled guides 4 the body 1 and are each formed along an outer edge with a row of teeth 5 meshing with a screwthread 6 formed on an adjustment sleeve 7. This sleeve 7 is formed of an inner ring 7.1 formed with the screwthread 6 and a tubular outer part 7.2 forming most of the outer surface of the chuck and rotationally and axially fixed to the ring 7.1. The sleeve 7 is axially nondisplaceable on the body 1 but can rotate thereon about the axis A. When the sleeve 7 is rotated in an opening direction 15 it moves the jaws 3 radially outward and when rotated oppositely in a closing direction 14 it moves them radially toward each other to grip a tool.

Figure 4:
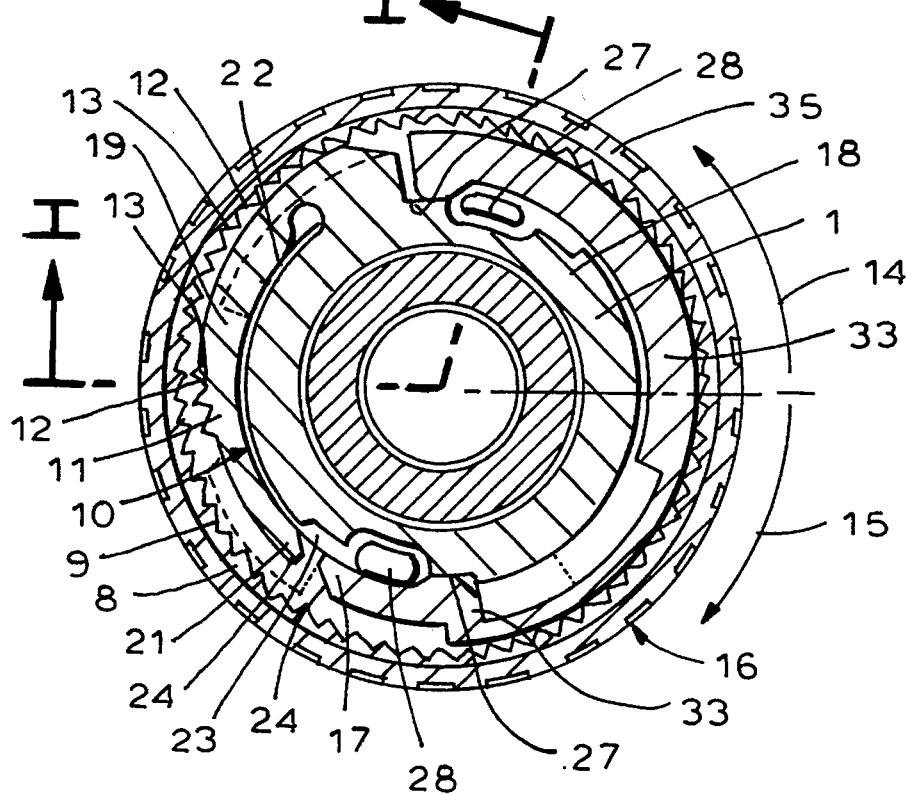

The adjustment sleeve 7 has a rear-end extension 8 internally formed with an annular array of sawteeth 9 complementarily engageable with sawteeth 11 formed on a radially displaceable locking body 10 that is angularly fixed on the body 1. As seen in FIGS. 4 and 5 these teeth 9 each have a steep flank 12 and a shallow flank 13 so that the teeth 9 and 11 lock together when the sleeve 7 tries to rotate relative to the body 1 in the reverse or opening direction 15 on the body 1 but can cam each other apart on opposite rotation of the sleeve 7 on the body 1 in the forward or tightening direction 14, due to the relative inclinations of their steep and shallow flanks 12 and 13, with the steep flanks 12 of the teeth 9 ahead in the direction 15 of the shallow flanks and the teeth 11 oppositely oriented.

Figure 8:
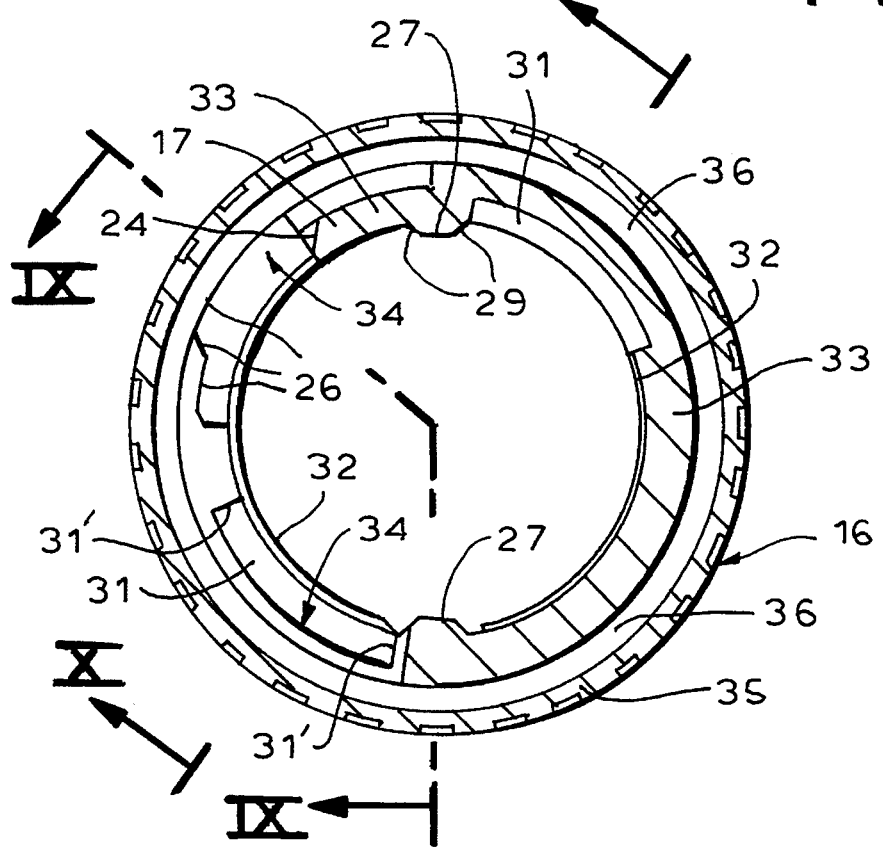
FIG. 8 is a section taken along line VIII—VIII of FIG. 7.
Figure 9:
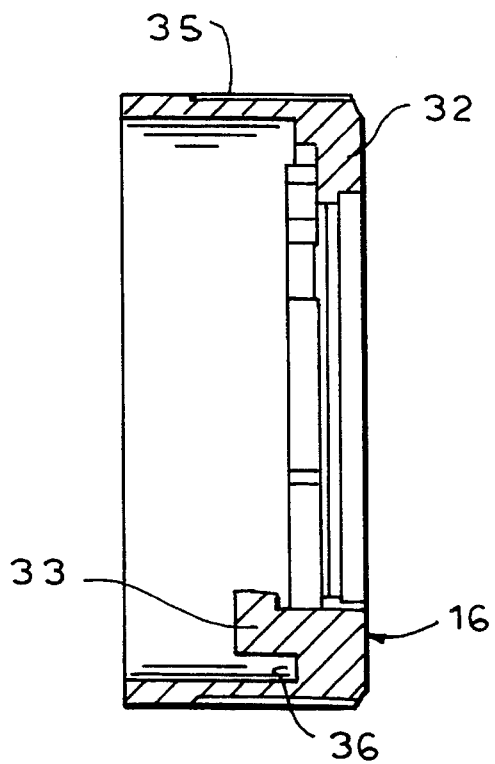
FIGS. 9 and 10 are sections taken respectively along lines IX—IX and X—X of FIG. 8.
Figure 10:
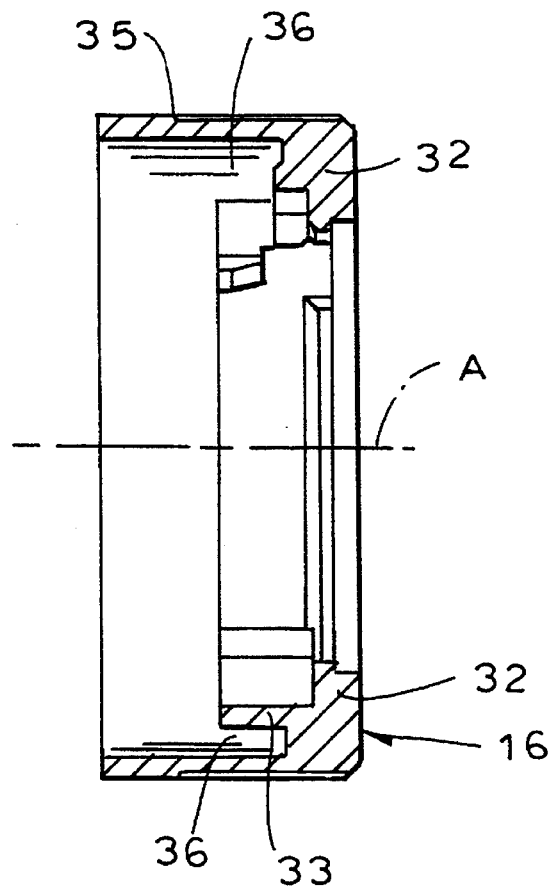
Figure 11:
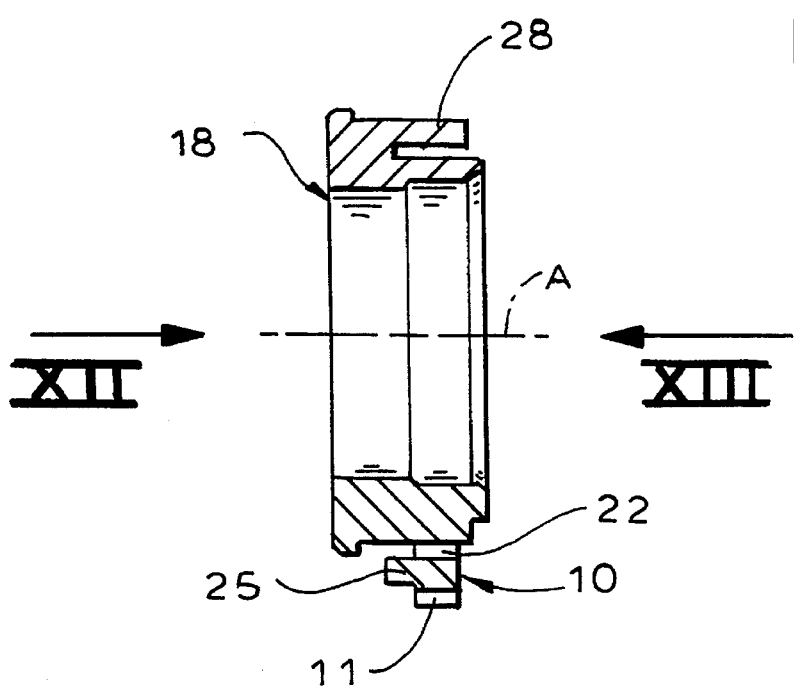
FIG. 11 is an axial section through the locking ring of the chuck taken along line XI of FIG. 13.
Figure 12:
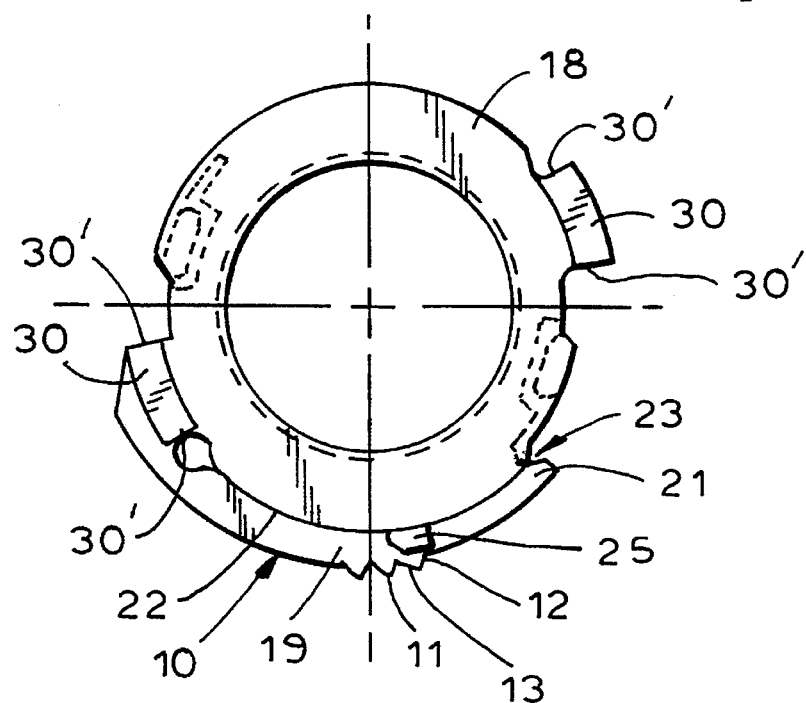
FIGS. 12 and 13 are end views taken in the direction of respective arrows XII and XIII of FIG. 11.
Figure 13:
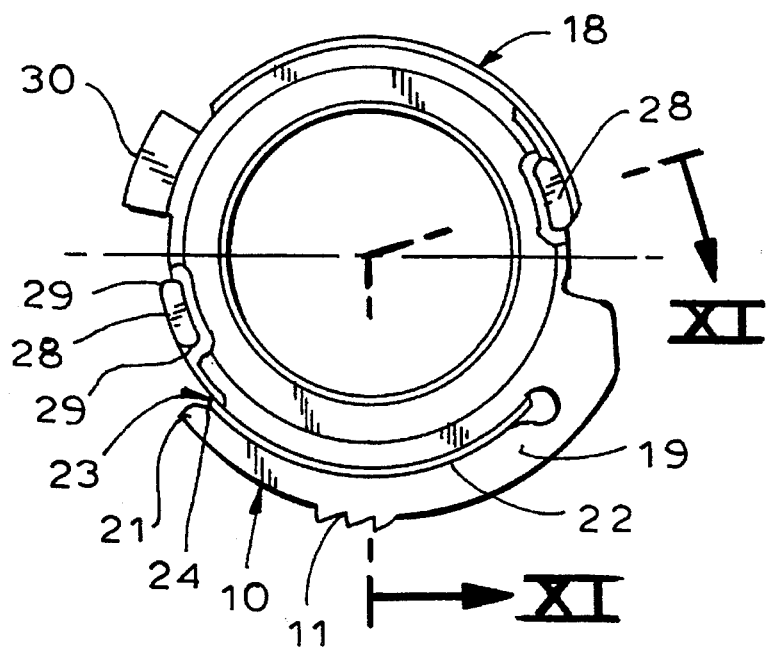

The locking body 10 is formed on an angularly projecting arm 19 in turn formed on a ring 18 (see FIGS. 11–13) fixed on the chuck body 1. This arm 19 forms an angularly elongated slot 22 and the teeth 11 are formed in a central region, that is between a free end 21 of the arm 19 and where it is attached to the ring 18. A setting or positioning ring 16 shown in some detail in FIGS. 8 through 10 is axially fixed on the chuck body 1 but limitedly angularly movable thereon through an angular stroke defined by abutments 20. This ring 16 carries an axially projecting actuating body or formation 17 that can displace the arm 19 carrying the locking body 10 between the open position of FIGS. 2 and 4 and the closed position of FIG. 5.

In the closed position the body 17 engages the free end of the arm 19 to urge the central teeth 11 outward, but the arm 19 is sufficiently elastically deformable that even in this position its central locking body 10 can be pushed radially inwardly to allow the teeth 11 to ratchet on the teeth 9 when the sleeve 7 is turned in the direction 14 relative to the body 1. The end 21 of the arm 19 defines with the arm 19 a mouth 23 of the slot 22 and the arm end 21 and the body 17 are formed with complementary bevels 24 so that when engaged together the body 17 will cam the arm end 21 outward and the body 12 will fit in the slot 22, engaging radially confronting surfaces 22' that define it.

The arm 19 is formed at the teeth 11 with an axially forwardly projecting actuating pin 25 level with a cam surface 26 formed on the angularly movable locking ring 16. As shown in FIG. 6, when the positioning ring 16 is displaced into the closing position relative to the body 1, it cams the pin 25 inward to positively pull the teeth 11 out of engagement with the teeth 9. Thus if the ring 16 is rotated in the opening direction 15 the part 17 will engage in the slot 22 and force out the part 10 with the teeth 11 and simultaneously the pin 25 will move to the deep part of the cam surface 26 to permit the teeth 11 to engage in the teeth 9. If the ring 16 is rotated in the closing direction 14 the part 17 will move out of the slot 22 and allow the part 10 with the teeth 11 to move inward while simultaneously the pin 25 is cammed inward to positively pull the teeth 11 out of engagement with the teeth 9.

The ring 18 fixed on the body I is formed with a pair of radially elastically deflectable and axially forwardly projecting arms or tabs 28 having beveled ends 29. The ring 16 is formed with complementary diametrically opposite bumps that can engage and slide angularly over the tabs 28, while inwardly deflecting same. In the fully open or closed position the tabs 28 lie to one side or the other of these bumps 27 and when traversing between these positions they must slide over them, while being inwardly deflected. Thus the formations 27 and 28 together releasably retain the parts 16 and 18 in the fully open and closed positions but permit them to be moved, with some effort, out of these positions.

The locking ring 18 is formed with two diametrically opposite radially outward projections 30 having angularly oppositely directed and radially extending flanks 30' that are received in radially inwardly open recesses or notches 31 formed in the ring 16 and having radially extending and angularly oppositely directed flanks 31' engageable with the flanks 30'. These flanks 30' and 31' form the abutments 20. The projections 30 therefore effectively limit the relative angular travel of the parts 16 and 18 to the difference between the angular dimensions of the projections 30 and notches 31, here about 30°.

The positioning ring 16 has as shown in FIGS. 8–10 at its rear end an inwardly projecting rim or shoulder 32 that engages inward over a portion of the fixed ring 18 and on which the cam 266 and the recesses i are formed. The shoulder 32 carries an axially forwardly projecting collar 33 formed with a cutout 34 accommodating the arm 19 and forming the bumps 27 and part 17. Outside the ring 16 is formed as a sleeve 35 with axially extending grip-enhancing flutes and forming with the collar 33 an annular groove or space 36 into which the rear end 8 of the body 7 projects.

The chuck described above functions as follows:

A tool is clamped in the chuck by fitting it into the space between the retracted jaws 3 and then rotating the adjustment sleeve 7 forward in the direction 14 relative to the locking ring 18, typically by holding the ring 16 in one hand and the sleeve 7 in the other. If the chuck is in the open position of FIGS. 1, 3, 4, and 6 the teeth 9 and 11 are out of contact and will not impede such rotation. Until the jaws 3 engage the unillustrated tool the sleeve 7 will rotate freely, advancing the jaws 3 inward and forward.

Once these jaws 3 engage the tool, however, the jaws 3, body 1, and ring 18 will be rotated forward with the sleeve 7, causing the actuation part 17 on the positioning ring 16 to enter into the mouth 23 of the slot 22 while pulling the cam surface 26 away from the actuation pin 25. This will force the teeth 11 into radial mesh with the teeth 9 while causing the pins 28 to deflect over the bumps 27, placing the chuck in the closed position of FIGS. 2 and 5.

In this position further forward rotation of the sleeve 7 relative to the chuck body I is still possible as the teeth 9 and 11 cam each other radially apart and slip on each other. Such action is possible because the arm 19 is quite elastically deformable. If the chuck is set up with a torque spring between the sleeve 7 and body 1, this allows some self-tightening action.

To unchuck the tool the sleeve 7 is rotated relative to the ring 16 in the opposite opening direction 15. To start with this pulls the actuation part 17 out of the slot 22 and brings the cam 26 against the pin 25, thereby pulling the teeth 11 out of mesh with the teeth 9. Thereafter the sleeve 7 can rotate freely in the opening direction 15 to spread the jaws 3 and drop the tool.

I claim:

1. A lockable drill chuck comprising:

a chuck body rotatable about an axis;

an adjustment body rotatable on the chuck body relative to the axis and fixed axially thereon, one of the bodies being formed with a plurality of angled guides spaced about the axis and the other body being formed with a screwthread;

respective jaws in the guides having toothed edges meshing with the screwthread, whereby rotation of the adjustment body on the chuck body in a forward closing direction about the axis moves the jaws radially toward one another and opposite rotation in a reverse opening direction moves the jaws radially apart;

an array of radially inwardly directed sawteeth on the adjustment body;

a locking ring on the chuck body having an elastically deformable locking arm having a free outer end and sawteeth offset from the free end and engageable with the adjustment-body teeth, the arm being radially deflectable between an outer meshed position with the locking-arm sawteeth meshing with the adjustment-body sawteeth and an inner out-of-mesh position;

a positioning ring rotatable on the chuck body about the axis between angularly offset locked and unlocked positions and having an actuation part engageable in the locked position with the free end of the locking arm to urge same radially outward into its outer position, the sawteeth being angled such that in the meshed position they positively inhibit rotation of the positioning ring relative to the locking ring in the opening direction while rotation of the positioning ring relative to the locking ring in the closing direction cams the sawteeth radially apart, the arm being sufficiently elastically deformable that, in the locked and meshed positions, rotation of the locking ring in the closing direction relative to the locking ring cams the teeth apart enough to slip angularly relative to one another; and abutments on the chuck body engageable with the positioning ring and limiting rotation of the positioning ring to movement between its positions.

2. The lockable drill chuck defined in claim 1 wherein the locking ring is fixed on the chuck body.

3. The lockable drill chuck defined in claim 2 wherein the arm defines an angularly open slot having a mouth and in the locked position the actuation part engages through the mouth into the slot and is braced radially outward against the arm.

4. The lockable drill chuck defined in claim 3 wherein the free end of the arm and the actuation part have complementary and angularly engageable bevels.

5. The lockable drill chuck defined in claim 3 wherein in the locked position the actuation part directly contacts and bears radially inward on the chuck body and directly contacts and bears radially outward on the free end of the arm, the slot having at its free end in the inner position a radial width smaller than a radial thickness of the actuation part.

6. The lockable drill chuck defined in claim 1 wherein the arm is formed offset from its free end at its sawteeth with an axially projecting pin, the positioning ring having an angled cam that engages and radially inwardly presses the projecting pin in the unlocked position of the positioning ring.

7. The lockable drill chuck defined in claim 1 wherein one of the rings has a radially deflectable and axially extending projection and the other ring has a radially projecting bump angularly engageable with the projection, the projection lying to one angular side of the bump in the locked position and to the other angular side of the bump in the unlocked position and being elastically deflected inward as the positioning ring moves between the locked and unlocked positions.

8. The lockable drill chuck defined in claim 7 wherein the projection is an axially extending pin formed on the locking ring.

9. The lockable drill chuck defined in claim 7 wherein the projection and bump have complementary and angularly engageable bevels.

10. The lockable drill chuck defined in claim 1 wherein the positioning ring is formed with at least one radially inwardly open pocket having flanks and the locking ring has a radially outwardly projecting tab extending into the pocket and having flanks engageable with the pocket flanks and forming therewith the abutments.

11. The lockable drill chuck defined in claim 1 wherein the teeth of the adjustment body have steep and shallow flanks and the steep flank of each tooth is axially ahead of the respective shallow flank in the opening direction.

12. A lockable drill chuck comprising:

a chuck body rotatable about an axis;

an adjustment body rotatable on the chuck body relative to the axis and formed with
a rim engaging inwardly over the chuck body,
an outer skirt projecting axially forward and formed with a radially inwardly open arm pocket and with a pair of radially inwardly open abutment pockets, and
an inner collar projecting axially forward and forming with the outer skirt an forwardly open annular space, one of the bodies being formed with a plurality of angled guides spaced about the axis and the other body being formed with a screwthread;

respective jaws in the guides having toothed edges meshing with the screwthread, whereby rotation of the adjustment body on the chuck body in a forward closing direction about the axis moves the jaws radially toward one another and opposite rotation in a reverse opening direction moves the jaws radially apart;

an array of radially inwardly directed sawteeth on the adjustment body;

a locking ring fixed on the chuck body having an elastically deformable locking arm received in the arm pocket, having
a free outer end,
sawteeth offset from the free end and engageable with the adjustment-body teeth, and
an axially projecting actuation pin offset from the free end and at the sawteeth,
the arm being radially deflectable between an outer meshed position with the locking-arm sawteeth meshing with the adjustment-body sawteeth and an inner out-of-mesh position;

a positioning ring rotatable on the chuck body about the axis between angularly offset locked and unlocked positions and having
an actuation part engageable in the locked position with the free end of the locking arm to urge same radially outward into its outer position, the sawteeth being angled such that in the meshed position they positively inhibit rotation of the positioning ring relative to the locking ring in the opening direction while rotation of the positioning ring relative to the locking ring in the closing direction cams the sawteeth radially apart,
a cam surface engageable with the actuation pin in the unlocked position to force the pin radially inward and set the arm in the out-of-mesh inner position,
the arm being sufficiently elastically deformable that, in the locked and meshed positions, rotation of the locking ring in the closing direction relative to the locking ring cams the teeth apart enough to slip angularly relative to one another; and abutment tabs on the locking ring engaged in the abutment pockets limiting rotation of the positioning ring to movement between its positions.

\* \* \* \* \*